US006282238B1

(12) United States Patent
Landry

(10) Patent No.: US 6,282,238 B1
(45) Date of Patent: Aug. 28, 2001

(54) ADAPTER CARD THAT SELECTS BETWEEN AN ISDN INTERFACE AND AN ANALOG MODEM INTERFACE

(75) Inventor: James F. Landry, Germantown, MD (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/322,954

(22) Filed: May 28, 1999

(51) Int. Cl.[7] .................................................. H04B 1/38
(52) U.S. Cl. .................... 375/222; 375/93.01; 375/93.05
(58) Field of Search .................................. 375/222, 220; 710/31, 64; 370/264, 271, 419, 420, 463, 422; 379/90.02, 93.01, 93.05, 93.06, 93.16

(56) References Cited

U.S. PATENT DOCUMENTS

| | | | |
|---|---|---|---|
| 5,553,132 | 9/1996 | Randahl | 379/252 |
| 5,764,755 | 6/1998 | Chen | 379/399 |
| 5,815,505 | * 9/1998 | Mills | 370/522 |
| 5,959,988 | * 9/1999 | Bjorkman et al. | 370/389 |
| 6,061,326 | * 5/2000 | Miller, II et al. | 370/203 |
| 6,112,260 | * 8/2000 | Colterjohn et al. | 710/31 |

OTHER PUBLICATIONS

Motorola, MC145572 ISDN U–Interface Transceiver, downloaded on May 6, 1999 from http://www.mot.com/SPS/MCTG/MDAD/isdn/mc145572.html.

* cited by examiner

Primary Examiner—Stephen Chin
Assistant Examiner—Mohammad Ghayour
(74) Attorney, Agent, or Firm—Michaelson & Wallace; Peter L. Michaelson; Janet M. Skafar

(57) ABSTRACT

A computer includes an adapter. The adapter includes an ISDN connection capable of communicating ISDN signals between the computer and a remote device. The adapter also includes an analog modem connection capable of communicating analog modem signals between the computer and the remote device. A selector device selects either the ISDN connection or the modem connection with which to transfer information between the computer and the remote device. The adapter card may transfer either analog modem information or ISDN modem information.

17 Claims, 10 Drawing Sheets

ADAPTER CARD THAT SELECTS BETWEEN AN ISDN INTERFACE AND AN ANALOG MODEM INTERFACE

FIELD OF THE INVENTION

This invention relates to communication systems, and more particularly to computer device interfaces.

BACKGROUND OF THE INVENTION

Common analog telephone communications devices allow users to exchange audio information via analog signals over a pair of analog transmission wires extending between a telephone network's central office (CO) equipment and the subscriber's (telephone user's) premises and, if necessary, trunk lines between COs. The wires are known in the art as a subscriber loop.

Digital data from modern computer systems may be transmitted over analog lines using analog modulator-demodulators (modems). A modulator converts a digital signal to a corresponding analog signal (e.g., a tone) that may be transmitted over the subscriber loop of a plain old telephone system (POTS). A demodulator converts the analog signal back to the corresponding digital signal. Modems are now commonly connected to "personal computers" (PC) to enable PCs to transfer digital information over POTS. Unfortunately, these modems are typically restricted to transmitting a narrow data bandwidth.

Fiber optic communication systems are a recently developing technology that display many benefits over POTS. The fiber optic systems transmit information faster, are more reliable, and can carry signals having a greater bandwidth than POTS. The fiber optic systems can transmit signals over great distances with less signal strength loss or signal distortion than POTS. POTS do exhibit some benefits over fiber optic systems including the relative high expense of fiber optic systems. Additionally, in most developed nations, POTS already exist while fiber optic systems must be installed. Thus, there are large incentives to improve and develop existing POTS systems.

The integrated services digital network (ISDN) protocol has a basic rate interface version (ISDN BRI) that provides for the transmission of data and voice signals using the POTS subscriber loop. ISDN BRI can carry a greater bandwidth over subscriber loops than POTS can carry over subscriber loops. The transmission equipment required for ISDN BRI is referred to as the digital subscriber loop (DSL). ISDN BRI comprises two 64 KBit/second bearer (ISDN B) channels for transmitting voice, data, etc. and one 16 KBit/second data (ISDN D) channel for transmitting signaling data or packet-switching (in the United States). Thus, ISDN BRI is also commonly referred to as 2B+D access.

ISDN also has a primary rate interface (ISDN PRI) version that can carry a greater bandwidth than ISDN BRI utilizing modified subscriber loop technology. PRI includes 23 ISDN B channels and one ISDN D channel (23B+D). In Europe, ISDN PRI has 30 ISDN B channels and one ISDN D channel (30B+D). ISDN narrowband comprise ISDN BRI and ISDN PRI. Asynchronous transfer mode (ATM) protocol is a well-known broadband version of ISDN, and is sometimes referred to as "broadband ISDN".

Two ISDN interfaces are especially applicable to the present invention; the ISDN U interface and the ISDN S/T interface. In the United States, ISDN BRI service is provided via the network "U interface" by a connection to the subscriber's network termination apparatus (NT). The U interface is specified in the American National Standard for Telecommunication publication entitled, "Integrated Services Digital Network (ISDN)—Basic Access Interface for use on Metallic Loops for Application on the Network side of the NT (LAYER 1 Specification)", also known as ANSI T1.601. The ANSI T1.601 specification describes the physical interface located between a line termination (LT) side of the DSL (that is located at the CO), and a Network Termination (NT) side of the DSL (that is located at the subscriber's premises).

The U interface is a two-wire subscriber loop providing point-to-point communication only. That is, only one device (having an embedded U interface termination) may be attached directly to each U interface. If the terminal equipment is provided with an embedded U interface connection and is connected to the subscriber loop, no additional terminals may be connected to the U interface.

Unlike the U interface, the S/T interface (specified by the International Telecommunications Union T Recommendation I.430, ITU-T Recommendation I.430, and ANSI T1.605 in North America) enables connecting multiple terminal equipment to the ISDN U interface at the customer premises. ISDN S/T interface connections are provided in Europe where the NT apparatus is considered the property of the local phone company. The device that converts the U interface to the S/T interface is referred to as a Network Termination Type 1 (NT1) interface device. The NT1 interface device is an active electronic device known by those skilled in the art. The U-interface allows the terminal apparatus to communicate with a central office, while the S/T interface permits terminals to be connected to the network.

As computer networks become more numerous and elaborate, there will be a greater number of network interfaces. One such interface is the peripheral component interconnect (PCI) contained in most personal computers (PC). Network interface cards (NIC) are add-on cards that enable computers to be attached to a network. A variety of network interface cards (NIC) are configured to connect with the computers at the PCI. As network deployment increases, the NIC market has exploded. Devices connected via NIC connections have been relatively simple at this time, such as fax machines, modems, or other peripherals. As networks expand, and the associated computers are called upon to perform more tasks for more end users, it is expected that the NICs will provide more functionality.

Telephones are now able transmit voice information using a computer network. Each computer connected to a telephone requires a separate. To connect a telephone to a computer, the phone portion converts the analog voice signal into a digital signal that may be processed and carried to a remote telephone. Long distance telephone calls may be made over the Internet while paying relatively low Internet access rates.

In general, computers being able to process multiple varied types of audio, video, and data based information is referred to as multimedia. As multimedia computer characteristics increase, there is be a trend to connect more, and an increased variety of, devices to computers. This connection of multiple varied devices to computers may tend to overburden the computer processor. Under extreme cases, the computer may not be able to run at all.

Many computers are configured to carry a limited number of interfaces. If a computer is attached to an ISDN connection, this may limit the other peripherals or communication links that connect to the computer. It may be desirable to provide a computer interface that can connect to multiple connection links. In addition, adding many interfaces, and software associated with the interfaces, to a computer may slow down the computer processor especially for computers having less powerful processors and computers not configured for multimedia applications.

The interfaces associated with computers throughout the world vary considerably. ISDN interfaces are no exception. For instance, in the United States, ISDN PRI comprises 23 ISDN B channels and one ISDN D channel; while in Europe, ISDN PRI comprises 30 ISDN B channels and one ISDN D channel. Ring cadence is a measure of the ring timing characteristics of a telephone (for example, the phone rings for a prescribed period then is silent for another prescribed period). Ring cadence is typically standardized in telephones of the same country, but varies from country to country. Ring frequency is a measure of the frequency that a telephone rings at. Ring frequency is also typically standardized in telephones of the same country, but varies from country to country.

Considering that NICs have the potential to be distributed in different countries throughout the world, it might be desired to provide a NIC that could adapt to the ISDN, telephone, and/or modem peculiarities of each country in which it is likely to be used. It might also be desired to provide a communication system that could provide either modem communications or ISDN communications as selected by an end user of the computer. It might be desired to provide a system that could interact with a variety of ISDN interfaces utilizing the PCI. It might be desired to provide an interface that, by itself, has multiple interfaces to distinct devices or communication systems. It might finally be desired to be able to provide an interface for multiple, possibly diverse, devices without requiring the computer to do all of the processing associated with the multiple interfaces.

SUMMARY OF THE INVENTION

A computer includes an adapter. The adapter includes an ISDN connection capable of communicating ISDN signals between the computer and a remote device. The adapter also includes an analog modem connection capable of communicating analog modem signals between the computer and the remote device. A selector device selects either the ISDN connection or the modem connection with which to transfer information between the computer and the remote device. The adapter card may transfer either analog modem information or ISDN modem information.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to various figures.

DETAILED DESCRIPTION

I. FUNCTIONS

Figure 1:
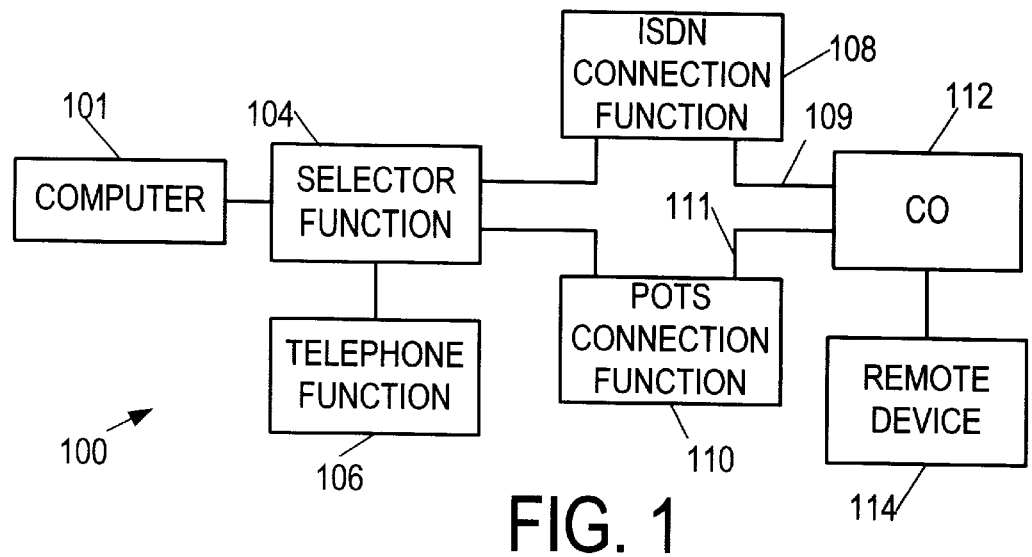
FIG. 1 depicts a functional diagram of a communication system that provides data communication over a network to a computer.

FIG. 1 depicts a computer, such as a personal computer (PC), for example, 101 that defines part of system 100. The system includes selector function 104, telephone 106, integrated services digital service network (ISDN) connection function 108, plain old telephone system (POTS) connection function 110, central office (CO) 112, and remote device 114. In FIG. 1, the computer 101 may connect to remote device function 114 using ISDN connection function or POTS connection function. Selector function 104 may select which connection (ISDN or POTS) will be used by the computer 101 to transmit data to and from CO 112. Network connection exists from CO 112 to remote device 114. Telephone 106 may also connect to remote device function 114 using either ISDN connection function or POTS connection function. An ISDN connection of the computer 101 may occur simultaneously with ISDN connection of telephone 106, as described below.

POTS connection function 110 provides analog service to the CO (and ultimately remote device) over subscriber loop 111, traditionally constructed from copper wire. ISDN connection function 108 provides ISDN service to CO (and ultimately remote device) over digital subscriber loop 109. Though subscriber loop 109 and 111 may in fact be the same subscriber loop (provided that ISDN connection 108 and POTS connection 110 are modified), it is preferable that a distinct subscriber loop be used for each connection function 108 and 110.

Selector function 104 determines whether ISDN connection function 108 or POTS connection function 110 will provide service between telephone 106 and remote device 114. Selector function is ultimately controlled by input to queries from either the telephone 106 or the computer 101. Though only computer 101, and telephone 106 are depicted in FIG. 1, it is envisioned that different devices may be used with the present invention.

Selector function also selects characteristics of ISDN communication functions, POTS communication functions, and/or telephone 106 based upon user input from the computer 101. For example, the user can select the telephone ring cadence and ring frequency in the telephone function based upon responses to queries submitted by end users. Ring cadence and ring frequency are typically standardized in phones contained in the same country. Therefore, if the end user of telephone process 106 is queried as to the country the phone is to be used in, then the response determines the correct ring frequency and ring cadence. Similarly, there are two ISDN interfaces (S/T interface and U interface) that may be used to provide ISDN connection, as described below. The S/T interface is typically used in Europe while the U interface is typically used in the United States. Therefore, when the end user responds to a query by the computer as to in which country the computer is to be located, the selector function may determine the correct interface for the ISDN connection process to use.

II. EXEMPLARY HARDWARE

Figure 2:
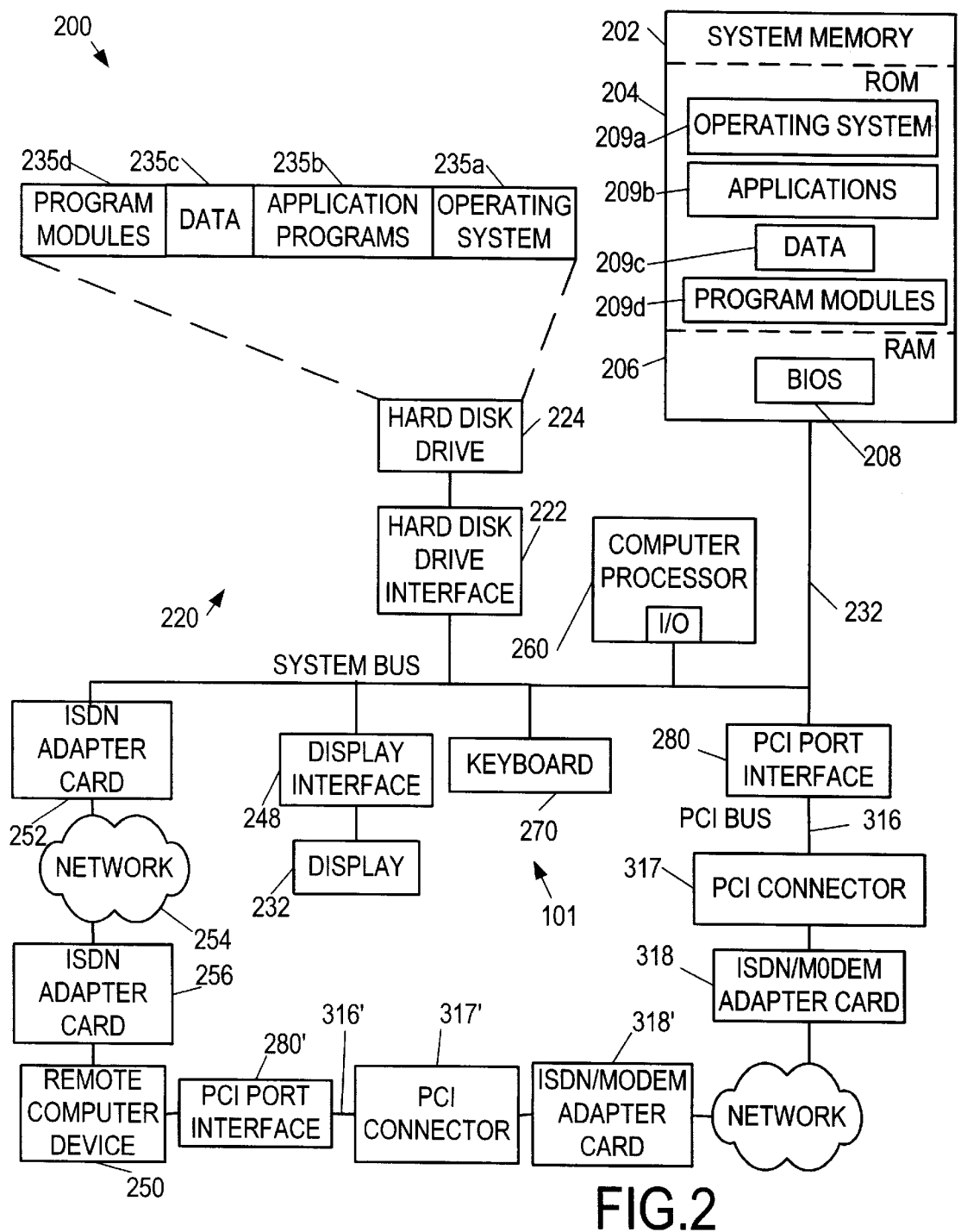
FIG. 2 depicts a block diagram of one embodiment of computer that utilizes an adapter card, depicted in FIG. 3.

Hardware generally associated with computer 101 is depicted in FIG. 2. Hardware generally associated with selector function 104, telephone 106, ISDN connection function 108, and POTS connection function 110 is depicted in FIG. 3.

Figure 3:
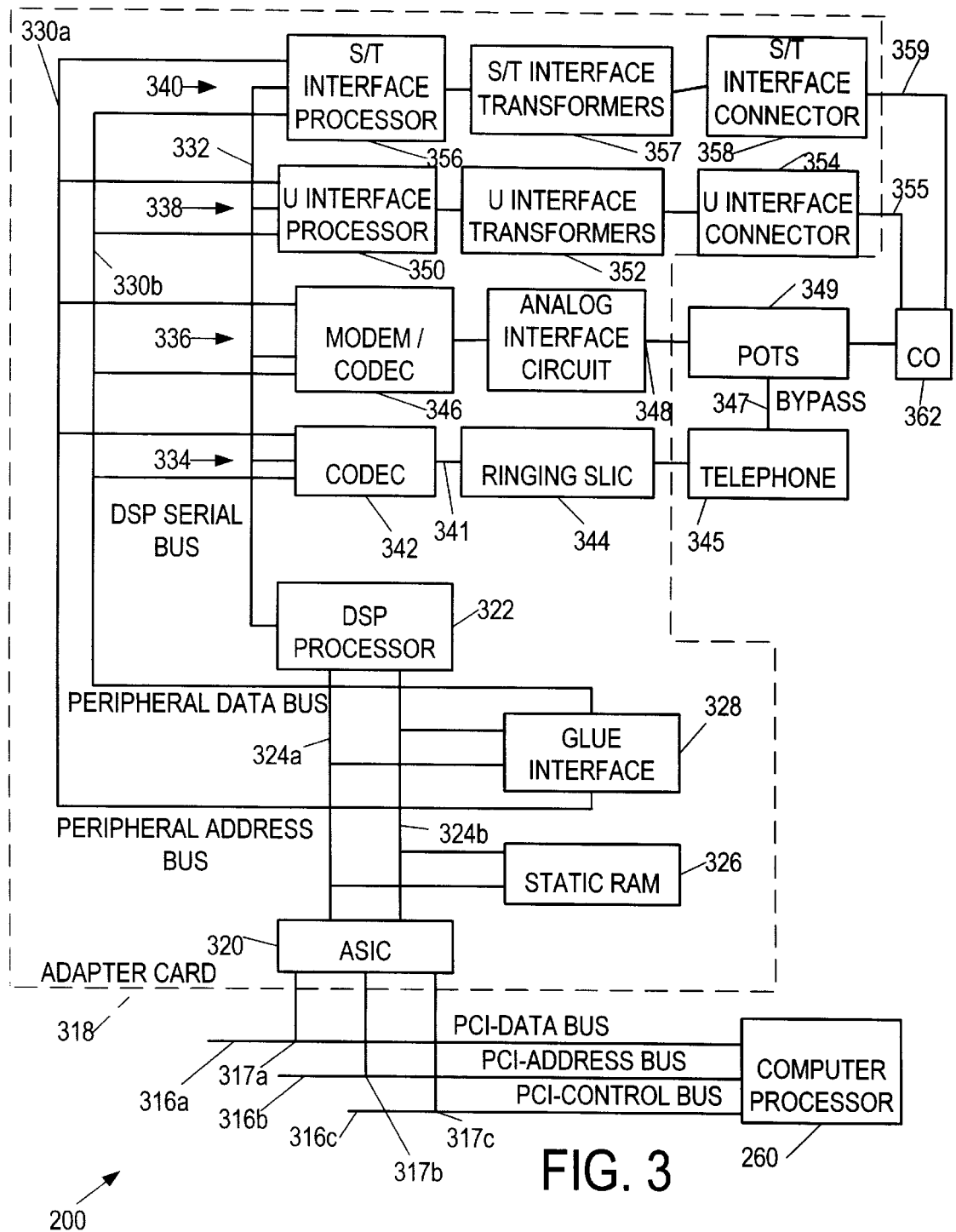
FIG. 3 depicts a block diagram of one embodiment of adapter card of the present invention that is connected to a PCI bus of a computer portion.
Figure 4:
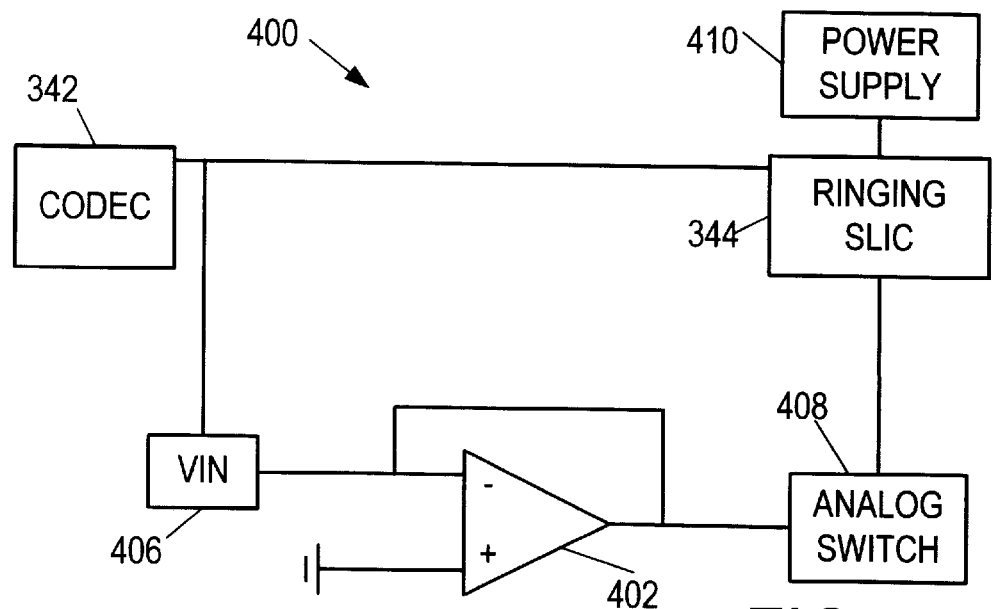
FIG. 4 depicts an embodiment of circuit schematic of a feedback circuit of the present invention that controls voltage supplied to the ringing SLIC.

Referring to FIG. 3, hardware associated with ISDN connection function 108 includes U interface portion 338 and S/T interface portion 340 described below. Hardware associated with POTS connection function 110 includes modem portion 336 described below. Hardware associated with telephone function 106 includes telephone portion 334 described below. Hardware associated with selector function 104 may include DSP 322, glue interface 328, static RAM 326, ASIC 320, PCI bus 316, and PCI function 260.

A. Computer Portion

System 200 includes computer 101 and adapter card 318, depicted in FIG. 3. The computer 101 includes peripheral component interconnect (PCI) bus 316 (which includes PCI data bus 316a, PCI address bus 316b, and PCI control bus 316c as illustrated in FIG. 3). Computer 101 further comprises PCI network interface card (NIC) connectors 317a, 317b and 317c. Though three distinct connectors 317a, 317b, and 317c are depicted in FIG. 3, the connector is preferably formed as an integrated connector, such that when one connector 317a is connected, the remaining connectors 317b and 317 are connected as well. Adapter card 318 can be inserted into the PCI connector 317 to enable the ISDN connection provided to the computer portion, as now described. Though the following embodiment described a connection to a PCI bus, other computer ports that are capable of carrying ISDN information may be used (for example ISA ports) while remaining within the scope of the present invention. Computer 101 may comprise any type of computing device such as an IBM compatible personal computer, an Apple computer, a workstation, a server, or a mainframe computer, for example.

In FIG. 2, memory 202 of the computer portion may comprise read only memory (ROM) portion 204 and random access memory (RAM) portion 206. RAM portion 206 may include BIOS 208 containing basic routines to transfer information between the elements within computer 101, such as during start-up. ROM portion 204 may include operating system portion 209a, applications portion 209b, data portion 209c, and other program modules portion 209d.

Computer 101 may include drive portion 220 comprising hard disk drive interface 222 and hard disk drive 224. Hard disk drive 224 reads from and writes to a hard disk, not shown. Hard disk drive 224 is coupled with the system bus by hard disk drive interface 222. The hard disk drive and its associated storage media provides non-volatile storage of machine readable instructions, data structures, program modules, and other information that may be utilized by the computer 101.

Some contents stored in hard disk drive 224 may be written into the ROM 204 during initial setup of the computer, such as the operating system. Some contents of the hard disk drive 224, i.e. applications, may be written into corresponding locations in the ROM or RAM as a result of user input of the computer. Hard disk drive 224 (and the associated hard disk) may comprise operating system portion 235a, application programs portion 235b, data portion 235c, and program module portion 235d. Portions 235a to 235d in the hard disk drive correspond to ROM locations 209a to 209d, respectively. Since the access space of the hard disk drive 224 is considerably larger than that of ROM 204, only some of the data and programs contained in the hard disk drive may be stored in the ROM at any given time. Though FIG. 2 depicts a hard disk drive, those skilled in the art will appreciate that other types of storage media may be used. These other types of storage media include, but are not limited to magnetic disk drives, optical disk drives, magnetic cassettes, flash memory cards, digital video disks, Bernouli cartridges, other types of RAM, and other types of ROM.

A number of program modules may be stored on the hard disk, ROM, or RAM, such as an operating system, one or more application program, display driver, printer driver, and program data, for example.

A user may enter commands and information into the computer through input devices, such as a keyboard 270, mouse, joystick, or microphone. Output devices may render data output from the computer, and may comprise such devices as display 232. The display 232 may be connected to the system bus via display interface 248. Other types of output devices include liquid crystal display, printer, and scanner. These input and output devices may be connected to the processor 232 through a suitable interface (serial port, parallel port, universal serial bus (USB), or PCI connectors 317a, 317b, 317c depicted in FIG. 3). Other known input devices and output devices are within the scope of the present invention.

Computer 101 may operate in a networked environment that defines logical connections to one or more remote computer, depicted in FIG. 2 as remote computer 250. The connections depicted in FIG. 2 are intended to comprise local area network (LAN), wide area network WAN, intranet, Internet, and/or ISDN connections. Remote computer 250 may be a computer similar to computer 101, described herein. Additionally, remote computer may be a server, router, network computer, other common network node, or any other known computer. Remote computer 250 includes many or all of the elements described above relative to the computer.

There are two connections between computer 101 and remote computer 250 depicted in FIG. 2. The first connection, which provides only an ISDN connection, includes ISDN adapter card 252, network cloud 254, and ISDN adapter card 256. The ISDN adapter card 252 is associated with computer 101 while the ISDN adapter card 256 is associated with the remote computer.

The second connection depicted between computer 101 and remote computer 250 in FIG. 1 includes PCI port interface 280, PCI bus 316, PCI connector 317, ISDN/ modem adapter card 318, network cloud 282 (plus the corresponding elements 280', 316', 317', and 318' that connect remote computer 250 to the network cloud 282. This second connection provides alternative ISDN and modem connection between computer 101 and remote computer 250. This second connection is more fully illustrated in FIG. 2, and is described relative thereto.

Computer portion comprises computer processor 260 that controls the operation of computer portion through data communications to the associated elements over system bus 262. Computer processor 260 may be any of the Pentium type of processors produced by Intel Corporation, or comparable processors for example.

Figure 5:
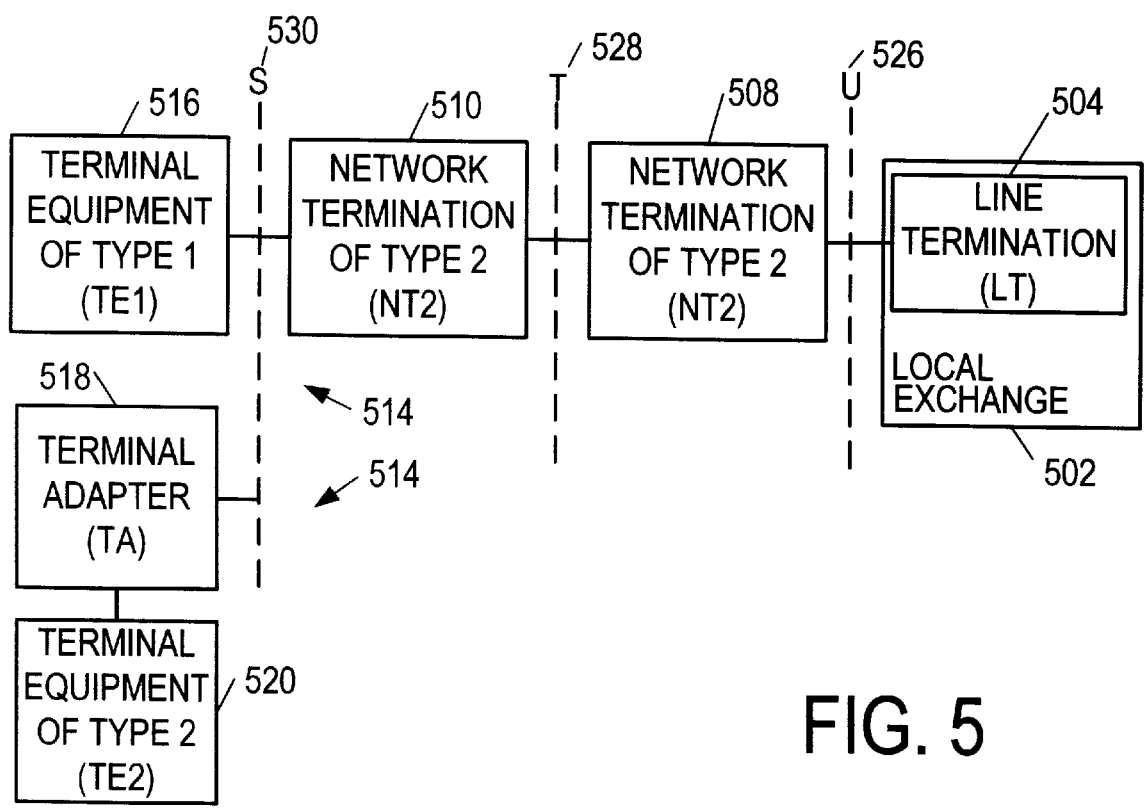
FIG. 5 depicts a block diagram of one embodiment of an ISDN subscriber loop.

FIG. 5 is a block diagram depicting functional connection points in an ISDN subscriber loop 500. ISDN subscriber loop comprises local exchange 502 that comprises a line termination (LT) 504 that depicts one end of subscriber loop 506. Network termination of type 1 (NT1) 508 is positioned at another end of the subscriber loop 506, and is located at the customer's premises. Network termination of type 2 (NT2) 510 is connected to NT1 508, and may incorporate complex functions such as switching and multiplexing. In some instances the functionality of NT1 and NT2 may be combined. There are two alternate terminal equipment arrangements 512, 514 that may be connected to NT2 510. For terminal equipment that has an ISDN user-network interface, a first arrangement 512 comprising terminal equipment of type 1 (TE1) 516 is used. TE1 equipment may include, e.g., telephones, fax machines, video cameras, and videophones. For user equipment not having an ISDN user-network interface, a second arrangement 514 that includes terminal adapter (TA) 518 and terminal equipment of type 2 (TE2) 520 is used. TA adapts a non-ISDN terminal to ISDN. An example of TE2 is computer equipment that is not configured with TE1 equipment for ISDN.

Three interfaces are illustrated in FIG. 5. U interface 526 is located between LT 504 and NT1 508. A device that connects to the U interface to communicate via local exchange 502 is referred to herein as a "U interface device". T interface 528 is located between NT1 508 and NT2 510. S interface 530 is depicted between NT2 510 and TE1 516. A device that connects to either the S interface or the T interface to communicate via local exchange 502 is referred to herein as an S/T interface device. A detailed description of the ISDN subscriber loop and the associated interfaces is provided in "*The ISDN Subscriber Loop*", Nick Burd, Chapman & Hall, 1997.

FIG. 3 depicts an adapter card 318 that is, in one embodiment, an add-on card. Adapter card 318, attaches via PCI connector 317 (depicted as 317a, 317b, and 317c), to the computer-PCI bus 316 (depicted as 316a, 316b, and 316c). The adapter card portion gives the computer direct access to an ISDN basic rate interface (BRI) using U or S/T interfaces. The adapter card also provides a modem connection involving POTS to the computer. The adapter card provides a telephone connection 345 to remote users.

Adapter card may include application specific integrated circuit (ASIC) 320 that connects computer processor 260 (depicted in FIG. 2) to a digital signal processing (DSP) processor 322. ASIC includes registers and a processor, and as such, is capable of processing as described below. ASIC is connected to DSP processor 322 via DSP address bus 324a and DSP data bus 324b. DSP processor 322 performs the top level processing of data transmitted within the adapter card. ASIC 320 is programmed to enable DSP processor 322 to interact with the computer processor 260 such that the ISDN connector card may be considered by an end user as operating integrally within the computer portion 311. The ASIC allows a mailboxing scheme to be set up involving registers contained in the DSP processor 322 such that ASIC selects the DSP register to be used for certain DSP processes.

ASIC 320 provides physical logic that permits computer processor 260 to access and control the adapter card 318 through locations in the PCI I/O space (utilizing the DSP processor 322). ASIC may occupy 16 double words of address with the starting address configurable via the PCI bus 316. ASIC 320 can generate an ASIC interrupt of computer processor 260 via PCI bus 316. The ASIC interrupt may be used by ASIC 320 to access computer processor 260, and thereby transmit relevant data from adapter card 318 to computer processor. ASIC provides control of DSP processor 322 to computer processor 260. Working codes are loaded into static RAM 326 for functions to be performed by the DSP processor 322. ASIC includes phase width modulator (PWM) for speaker modulation, clock synthesizer for stand-alone modem operation described below, and DSP I/O bit for control of the I/O port related functions.

DSP processor 322 provides the processing core of the adapter card 318 for communicating data to and from ISDN U interface portion 338, ISDN S/T interface portion 340, modem portion 336, analog telephone portion 334, and computer processor 260 via ASIC 320. DSP processor manipulates ISDN B-channel data, thereby providing high level data link (HDLC) processing (for either the S/T interface portion 340 or the U interface portion 338). DSP processor communicates and processes data to and from modem/CODEC 346 to provide modem operations with the analog interface circuit 348. DSP processor 322 also performs data movement and manipulation to and from CODEC 342 to provide telephone operations.

DSP processor 322 contains eight DSP registers. The DSP registers are used to store and transmit, quickly, such data as CODEC voice signals temporarily stored as data. Static RAM 326 is used by the DSP processor in storing data received from other locations to be processed by DSP, and in storing information processed by DSP that is to be transmitted. In addition, static RAM stores instructions associated with the DSP operations.

DSP processor 322 can interact with analog telephone portion 334, modem portion 336, ISDN U interface portion 338, and ISDN S/T interface portion 340 via DSP serial bus 332. DSP processor also connects to static RAM 326, and glue interface 328 via DSP busses 324a and 324b. Glue interface 328 connects to analog telephone portion 334, modem portion 336, ISDN U interface portion 338, and ISDN S/T interface portion 340 via peripheral address bus 330a and peripheral data bus 330b.

ISDN Interface Portion

The ISDN interface may include a U interface portion and/or an S/T interface portion, each of which is described below.

The ISDN U interface portion comprises U interface processor 350, U transformer 352, U interface connector 354, and ISDN subscriber loop 355. The ISDN S/T interface portion comprises S/T interface processor 356, S/T transformer 357, S/T interface connector 358, and ISDN subscriber loop 359. Though both ISDN U interface portion 338 and ISDN S/T interface portion 340 are depicted in FIG. 3 (and described relative thereto), in actuality only one of the interface portions 338 or 340 will be utilized at any given time. The ISDN S/T interface portion is applicable in countries where the S/T interface is used, e.g. Europe, and the ISDN U interface portion is applicable in countries where the U interface is used, e.g. United States. Additionally, adapter cards containing only one interface (U or S/T) may be provided to users depending upon which interface is used within that country.

For versions of the adapter card containing a U interface portion, the U interface processor 350 may be a Motorola MC145572. The U interface processor performs HDLC conversion and buffering on the ISDN D-channel. The U interface processor 350 functions as a transceiver with CO 362 (and ultimately the remote device) since it transmits signals (via U interface transformer) to CO and it receives signals from CO, via U interface transformer 352. The B-channel data is processed via 16 bit serial interface on the DSP processor 322.

The ISDN U interface portion 338 provides a direct connection from subscriber loop 355 that attaches to U interface connector 354 (which is an RJ-45 connector). CO 362 is connected to the U interface connector 358 using two binary, one quaternary (2B1Q) U interface cable 359 that transmits and/or receives U interface information. U interface connector 354 is coupled to U interface transformer 352 that, in turn, is coupled to U interface processor 350. U interface transformer conditions the signals received from the central office over the RJ-45 connector 354. U interface transformer also protects the U interface processor 350 from sudden electrical spikes, such as may occur during an electrical storm. In effect, U interface transformer connects to the U interface processor to subscriber loop.

U interface processor 350 may decode data from the CO and places data signal on the DSP serial bus 332. U interface processor may also generate a clock signal that is phase locked to the CO to ensure that the ISDN data transmitted from the CO is properly synchronized. Furthermore, U interface processor 350 may receive data from the computer portion via the DSP serial bus 332, encode the data, and send the coded data to the CO. U interface processor acts at the physical level for data transmissions to and from the CO. For ISDN BRI, U interface processor 350 transmits data in frames containing two ISDN B channels, an ISDN D channel and overhead or maintenance bits. U interface processor acts to strip off B channel and D channel data relating to the U interface from all data received over the subscriber loop 355 from the CO. The U interface filters out noise and other unwanted signals from a U interface signal received from U interface transformer 352. U interface processor also performs a handshake function with the DSP processor 322 ensuring that communication lines exist between the U processor and the DSP processor (and ultimately the computer processor) before transmitting the data to the DSP processor.

The CO transmits ISDN signal over subscriber line 355 via the RJ-45 connector to be received by the U interface transformer 352. The U interface transformer transforms and conditions the ISDN signal received from the CO to a form that can be processed by the U interface processor 350. The U interface processor processes the transformed signal received by CO 362 at the physical ISDN level. The U interface processor 350 performs a more complex function than the S/T interface processor 356 since the U interface processor must also perform functions associated with NT1 508, depicted in FIG. 5, that S/T interface processors do not need to perform. Typical NT functions include switching, multiplexing, terminating the physical interface, maintenance functions, and power supply backup in case the main power fails.

For versions of the adapter card containing an S/T interface portion, the S/T interface processor 356 may be a Siemens 2186. The S/T interface processor performs HDLC conversion and buffering on the D-channel. The S/T interface processor buffers ISDN B-channel data and may interrupt the DSP.

The ISDN S/T interface portion 340 is connected by subscriber loop 359 to the central office (CO). Subscriber loop 359, that is formed from a transmit line and a receive line, connects to S/T interface connector 358 (preferably an RJ-45 connector). S/T interface connector 356 connects to S/T interface transformer 357 that, in turn, connects to S/T interface processor 356. S/T interface transformer 357 may transform and condition the signals transmitted received from CO over the RJ-45 connector 358. S/T interface transformer also protects the S/T interface processor 356 from sudden electrical spikes, such as may occur during an electrical storm. In effect, the S/T interface transformer couples the S/T interface processor 356 to subscriber loop 355.

S/T interface processor 356 decodes data from CO and place data signal on the DSP serial bus 332. S/T interface processor may also provide a clock signal that is phase locked to the CO to ensure that the ISDN data transmitted from the CO is properly synchronized. Furthermore, S/T interface processor 356 may receive data from the computer portion via the DSP serial bus 332, encodes the data, and sends the coded data to the CO. For ISDN BRI, S/T interface processor 356 transmits data in frames containing two ISDN B channels, an ISDN D channel, and associated overhead or maintenance bits. The S/T interface processor 356 may be considered a transceiver with CO 362 since it transmits signals to, and it receives signals from, CO via S/T interface transformer 357. The S/T interface processor strips off the B channel and D channel data relating to the S/T interface from the data received over subscriber loop 359 from the CO. The S/T interface also filters out noise and other unwanted signals from S/T interface signal received from the S/T interface transformer 357. S/T interface processor provides high-level data-link control (HDLC) of the signals being received from the CO. S/T processor performs a handshake function with the DSP processor 322 ensuring that communication lines exist between the S/T processor and the DSP processor (and ultimately the computer processor) before data is transmitted to the DSP processor.

Data and control information may be exchanged between the PCI bus 316 and a CO through either the U interface processor 350 or the S/T interface processor 356 (depending upon which ISDN interface the adapter card 318 is applied to). The data received and processed by the ISDN interface portions 338, 340 from CO, and processed by ISDN interface processors 350 or 356, are distributed first to DSP processor via DSP serial bus, then to ASIC 320 via DSP busses 324*a*, 324*b*, and finally to computer processor via PCI busses 316*a*, 316*b*, and 316*c*. DSP serial bus is time division multiplexed to provide transmission of frame bits at a prescribed rate.

DSP processor provides the processing core for data from the U and S/T interface based upon instructions from the computer processor. The DSP processor processes the U interface signals into a form that can be understood by the computer processor 260. DSP processor transmits the processed U interface data received from glue interface over DSP busses 324*a* and 324*b* to ASIC 320. ASIC transmits the signal, via PCI port interface 232 of FIG. 2, to computer processor. ASIC 320 contains an interrupt of computer processor, and enables computer processor to receive and process data transmitted to computer processor from ASIC. The computer processor initially accesses the received data in BIOS 208. The computer processor then may further access, process, print, display, or perform other functions to the U interface data based upon instructions stored in the operating system 209a and/or user input.

Telephone Portion

Analog telephone portion 334 includes telephone handset 345, telephone connector 343, ringing subscriber line interface circuit (SLIC) 344 and coder/decoder (CODEC) 342. The ringing SLIC may be of the type produced by Harris Semiconductor as part number HC5517. CODEC 342 may be produced by Motorola as part number MC 145480. Analog telephone portion 334 provides phone communication to telephone 345 depicted in FIG. 3 using either the ISDN U interface portion or the ISDN S/T interface portion to communicate over the ISDN network to CO 362 (and ultimately to a remote end user). Telephone handset 345 connects to telephone connector 343 and ringing SLIC 344. Telephone connector 343 is an RJ-11 telephone connector 343. The telephone transmits and receives call set-up information (over ISDN D channel) for both the U and the S/T interfaces. The telephone transmits and receives voice signals (over the ISDN B channel) for both the U and the S/T interfaces.

For an analog telephone network to operate, each telephone in the system must be able to place and receive call set-up signals, place and receive voice signals, and the receiving telephone must be able to ring when it receives a call set-up signal. To transmit voice signals, CODEC 342 translates the analog voice signal generated by the telephone 345 into a digital signal that may be easily transmitted over B channels of either the ISDN U interface portion 338 or the ISDN S/T interface portion 340. The digital signals produced by CODECs are pulse code modulated (PCM) into a serial stream. In the analog domain, voice signals for telephone are band limited between 300 and 3400 Hz. Nyquist sampling requires that any analog signal be sampled at a sampling rate that is greater than twice the highest analog signals frequency (8 KKz) to permit successful signal reconstruction.

Now consider telephone 345 receiving a call set-up signal from a remote location. CODEC 342 and ringing SLIC 344 interact to produce ringing in telephone 345. For call set-up signals returning from the CO 362 (and DSP processor 322) to CODEC 342, CODEC converts the digital call set-up signal into analog call set-up signal that is received by the ringing SLIC 344. CODEC generates an interrupt signal over DSP serial bus 332 to distinguish those signals arriving at DSP processor 322 over DSP serial bus that were generated by CODEC from those signals arriving at DSP processor over DSP serial bus that were generated by either the S/T interface processor 356 or the U interface processor 350. If CODEC transmits no interrupt to DSP processor, then any signal received by DSP processor 322 over DSP serial bus 332 is presumed generated by U interface portion 338 or S/T interface portion 340 (whichever one is active in the adapter card 318). Ringing SLIC amplifies the tip signal and the ring signal (which are carried on a ring conductor and tip conductor of analog loop 341, respectively) received from the CODEC 342. The voltage difference between the amplified tip signal and the amplified ring signal is used to generate the ring in the telephone. Ringing SLIC preferably uses a balanced sine wave ringing signal to produce ringing in telephone 345. A trapezoidal wave ringing pattern (or any other suitable wave pattern) may also be produced by the SLIC to generate the telephone ringing, and remain within the scope of the present invention. A signal that generates the ringing is therefore selected to be outside of the 399 to 8000 Hz range used by the CODEC for signal transmission of human voices.

Telephone 345 may ring at a variety of ring cadences (cadence is a measure of the period the phone rings and the period the phone is silent between rings) and ring frequencies (ring frequency is a measure of the frequency at which the phone rings). Ring cadence and ring frequency, which typically vary in telephones depending upon the country in which the phone is located, is selected by the user of telephone 345 in one embodiment of the present invention.

Amplifier 402 outputs a ring signal to ringing SLIC 344. Switch 408 is inserted between amplifier 402 and the ringing SLIC 344 to control application of the ringing signal thereto. Power supply 410 applies voltage, e.g. −85 volts, to the ringing SLIC. The ringing SLIC contain amplifiers such that it can produce a high, e.g. −85 volt sinusoidal output signal to telephone when a ringing signal is. The sinusoidal output signal is sufficient to produce ringing in telephone. When there is no ringing signal applied from CODEC, a low voltage is supplied via power supply. When there is no ringing, switch 408 is disconnected from ringing SLIC. When no ringing is required, −33 volts is applied to ringing SLIC to from power supply, and the analog switch 408 is disconnected from SLIC so no ring signal is applied to the ringing SLIC.

When adapter card is being installed in PCI connector 317, associated adapter card software is loaded from one of the drives 224, 228, or 232 in FIG. 3 into ROM 204 as known in the art. The adapter software causes the end user to be queried as to the country location of the telephone 345 by computer 101. The end user selects telephone operation based on a list of countries displayed to him based upon a look-up table loaded from disk drive 224, 228, or 232. Based upon the end users response to the query, computer processor loads data relating to the ring cadence and ring frequency from the selected country from one of the disk drives 224, 228, or 232.

The computer processor then loads the data from RAM via ASIC into static RAM 326 (the data is loaded in the adapter card by DSP processor 322). DSP processor may load information relating to the ring cadence and ring frequency into CODEC. The information may be used to program the ring cadence and ring frequency of ringing SLIC 344. Based upon the information programmed in the ringing SLIC, whenever CODEC generates ringing signal, the ringing SLIC generates the ringing signal (instead of the normal signal). The ringing SLIC causes the telephone 345 to ring at a prescribed cadence and frequency based upon the user input based upon the end users country selection.

Modem Portion

Modem portion 336 included on adapter card 318 comprises modem/CODEC 346, analog interface circuit 348, and POTS connector 349. The modem portion provides modem functionality to computer 101 over POTS connector. POTS connector connects analog interface circuit 348 to CO to provide communication of analog signals therebetween. The modem/CODEC 346 converts the analog signal used in the POTS 342 into a digital signal that can be processed and carried to a remote location (or vice versa). Analog interface circuit 348, which includes a transformer, provides protection to the circuitry of the modem/CODEC. Additionally, analog interface circuit provides on-hook and off-hook services to control communications over the modem portion. This modem portion may function simultaneously with ISDN portion 338 or 340. For example, computer may communicate to a CO over modem portion 336 simultaneously with user of telephone 345 communicating over ISDN connection 338 or 340.

Glue Interface

Glue interface is configured as a programmable logic device (PLD, i.e. Altera Corporation part number EPM7064). The PLD is a combinational logic element which functions as a look-up table so certain data being received from the analog telephone portion 334, modem portion 336, ISDN U interface portion 338, or ISDN S/T interface portion 340 can be interpreted by the DSP processor 322 (and vice versa). Any other combinational logic part of appropriate size and speed may be utilized as the glue interface, such as programmable logic arrays (PLA), electrically erasable programmable devices (EEPROM), etc.

Glue interface PLD 328 provides control functions (such as decoding the address information contained in the peripheral address bus 330a into the range of addresses contained within the DSP) of the U interface signal in a form to be processed by the DSP processor 322. In this manner, the DSP functionality is extended to U interface processor 356.

Glue interface 328 provides an interface (over peripheral address bus 330a and peripheral data bus 330b) to analog telephone portion 334, modem portion 336, U interface portion 338, and S/T interface portion 340. Glue interface extends the control of DSP processor 322 to the peripherals. This is accomplished by the glue interface controlling the peripheral data busses 330a, 330b depicted in FIG. 3. In effect, glue interface acts as a translator so DSP processor can extend its commands to the peripherals. Glue interface provides control functions such as buffer enabling of the DSP, DSP address decoding, and glue for the U and S/T interface portions. The glue interface provides DSP processor read and write register functions to provide control of the various DSP board functions (i.e. SLIC control, ringing, modem option selection, etc.).

III. EXAMPLES OF OPERATION

This section describes operation of adapter card 318 in setting up and establishing communications to a remote device. This section contains portions describing ISDN communication call set-up and establishing, modem communication set-up and establishing, and telephone communications using ISDN subscription loops. In this section, the term "original" relates to the device originally attempting to communicate with another device. The term "remote" relates to any device(s) that the original device attempts to communicate with. When reading this section, the flow diagrams depicted in FIGS. 6–11 should be read in conjunction with hardware diagrams depicted in FIGS. 2 and 3 (described above). For brevity, not all potential call options depicted in FIGS. 6–13. FIGS. 6–13 depict only those processes necessary to establish the desired communications.

ISDN Communications

Figure 6:
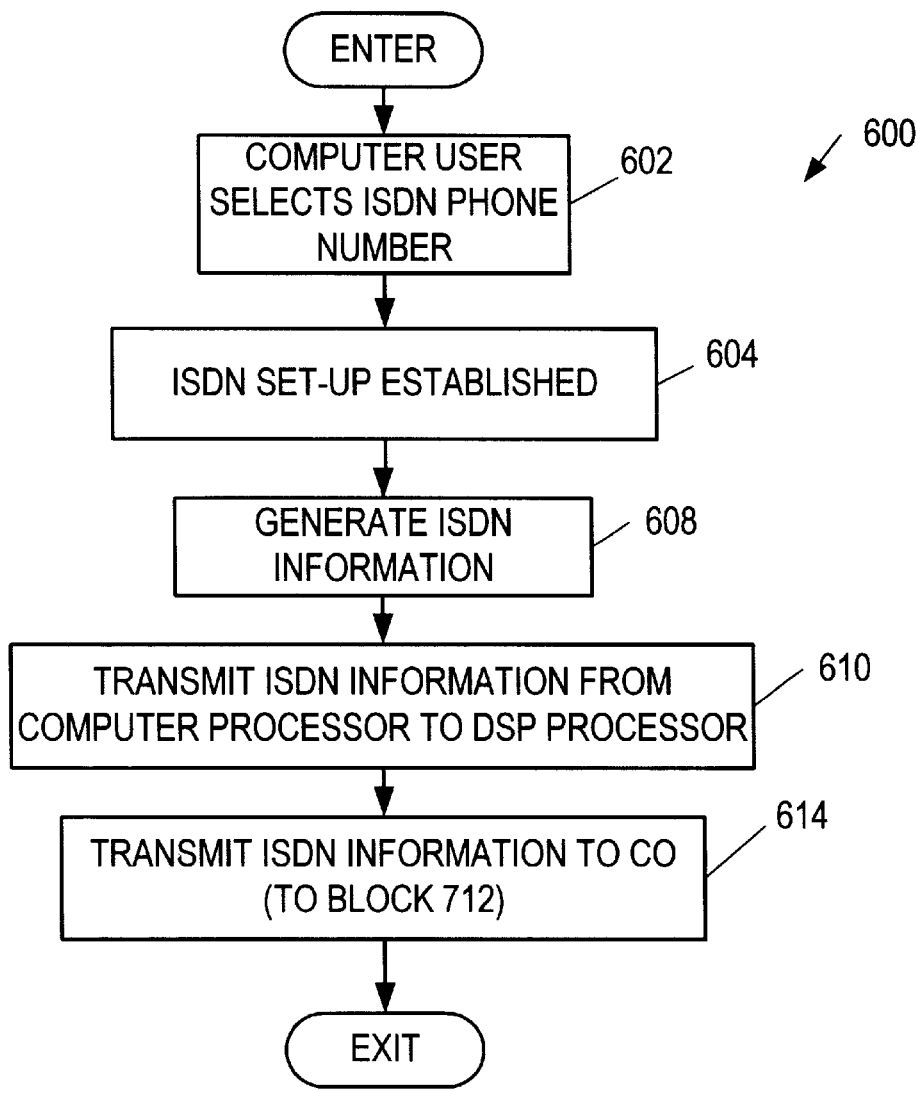
FIG. 6 depicts a block diagram of one embodiment of logic used by ISDN portion of the adapter card in transmitting an ISDN signal.
Figure 7:
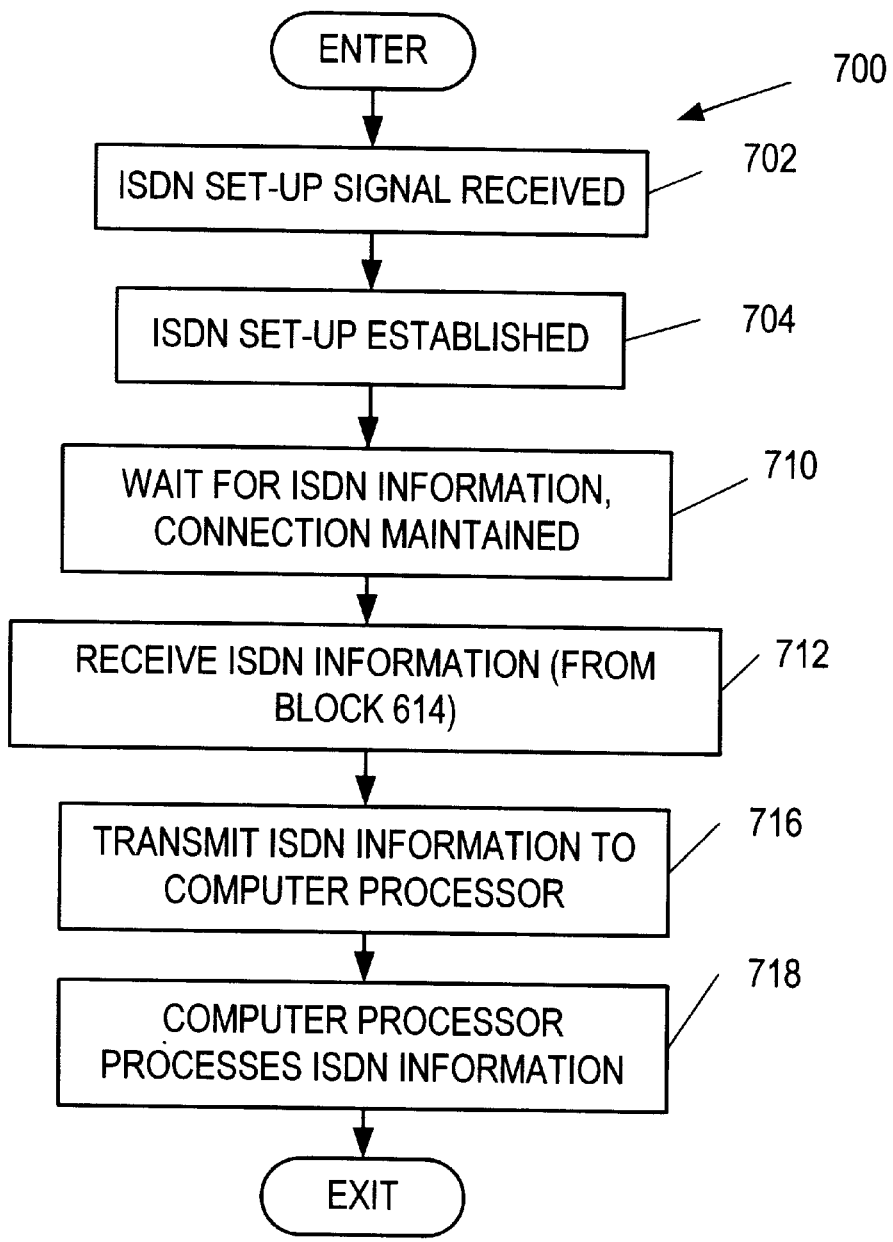
FIG. 7 depicts a block diagram of one embodiment of logic used by ISDN portion of adapter card in receiving an ISDN signal.

FIGS. 6 and 7 depict ISDN communications between original device and remote device utilizing the U interface portion 338. The process is similar to the ISDN communications utilizing the S/T interface portion 340, so only the U interface portion is depicted and described herein. FIG. 6 depicts an ISDN transmission function 600 of original device involved with transmitting ISDN set-up signals and ISDN information signals. FIG. 7 depicts an ISDN reception function 700 of remote device involved with receiving ISDN set-up signals and ISDN information signals. The following is applicable to ISDN modem communications, ISDN telephone communications, ISDN file transfers, and all known type of ISDN communications.

To set up ISDN communications between original and remote devices, an end-user at original device or computer 101 dials an ISDN phone number of the remote device that they wish to communicate to in step 602. This phone number is typically prompted from ISDN software located in applications 209d. When the phone number is dialed, an ISDN set-up signal is transmitted from computer processor 260 via ASIC 320 to DSP processor 322. DSP processor 322 transmits ISDN set-up signal through glue interface (that converts the ISDN set-up signal into a form that can be processed by ISDN U interface processor 350) to ISDN U interface transformer 352 where the signal voltage level is transformed to a level that can be carried over ISDN connection 355. The ISDN set-up signal continues via CO 362 to remote ISDN device. The set-up signal is followed by a series of ACK signals and handshakes to establish an ISDN communication between the computer 101 and the remote device or computer 250. The ACK signals and handshakes are generally known to those skilled in the art, and will not be further detailed herein.

After the ISDN connection is established between computer 101 and remote computer 250, computer processor generates ISDN information in step 608 (provided the information has not already been generated). This ISDN information may be, e.g. data, graphics information, voice information, or any other type of information normally carried on ISDN systems. After the ISDN information is generated in step 608, the ISDN information is transmitted via ASIC 320 to DSP processor 322 where the digital information is initially stored in the registers of the DSP processor 322 selected by ASIC 320. DSP processor then transmits ISDN information to U interface processor 50 that, at the physical level, transmits the ISDN information via U interface transformer 353 to CO 362 in step 614.

Now, the ISDN reception function 700 at receiving device depicted in FIG. 7 is described. When ISDN set-up signal is received by U interface portion 338, it goes through the general process of returning an ACK signal if an ISDN connection can be established or returning a NACK signal if an ISDN connection cannot be established. ACK and NACK signals are generally well known, and will not be further detailed here. The following description assumes that an ACK signal has been returned to the original computer 101, and that the ISDN connection has been established.

In step 712, the U interface portion 338 of remote device receives ISDN information transmitted from original ISDN device (from step 614 of original device, described above). The U interface transformer initially transforms the signal containing the U interface information to a level that can be processed by U interface processor 350 of remote device. U interface processor then processes the signal at the physical level, and transmits the signal to DSP processor. The DSP processor processes the U interface information and generates the U interface information to ASIC 320. ASIC transmits an ASIC interrupt of computer processor such that the U interface information can be transmitted to computer processor or remote device. The computer processor then processes the ISDN information in a manner determined by operation of computer 101, the type of ISDN information (data, voice, digital images, etc.), and instructions from the end user.

Telephone Communications

Figure 8:
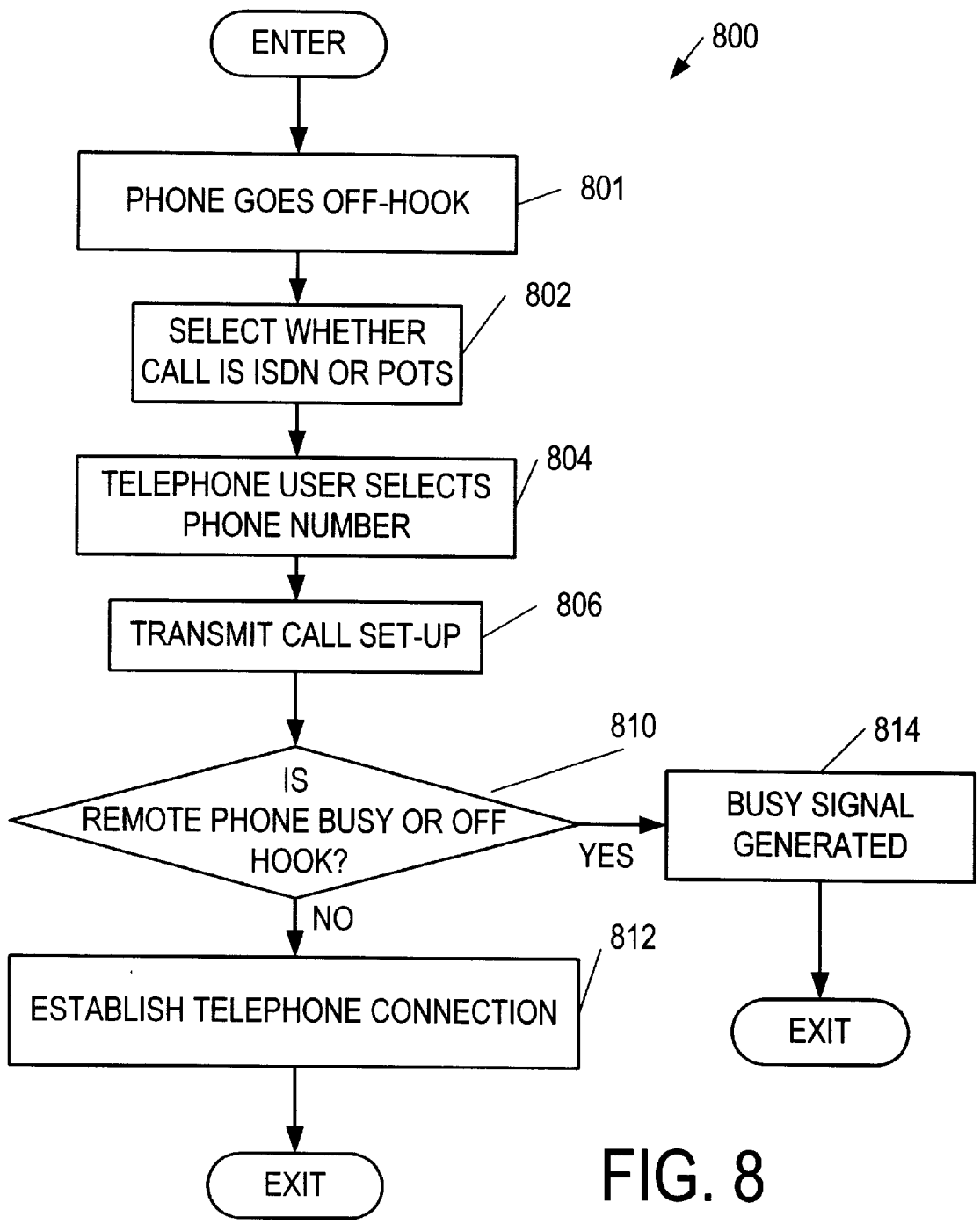
FIG. 8 depicts a block diagram of one embodiment of logic used by telephone portion of adapter card in making a telephone call.
Figure 9:
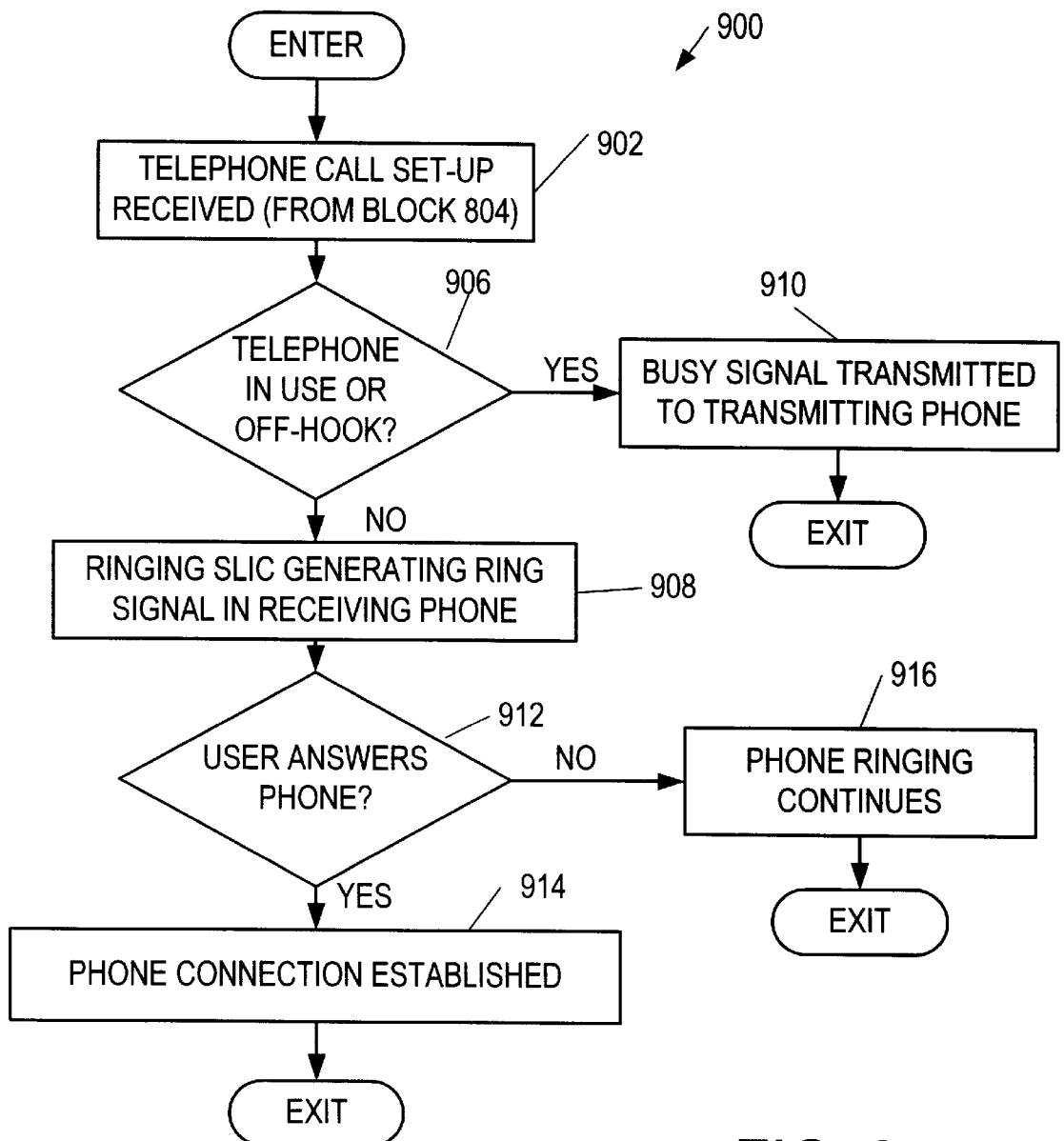
FIG. 9 depicts a block diagram of one embodiment of logic used by telephone portion of adapter card in receiving a telephone call.

FIGS. 8 and 9 depict telephone communications between original telephone 345 and remote telephone. FIG. 8 depicts functions involved with placing a telephone call from original telephone. FIG. 9 depicts functions involved with receiving a telephone call at remote telephone.

FIG. 3 depicts two telephone lines 339 and 347 connected to telephone 345. Telephone line 339 connects telephone 345 to ringing SLIC to provide phone calls over an ISDN connection. Alternatively, telephone bypass line 347 is connected to POTS 349 to provide POT service to telephone. The telephone may be either connected via telephone line 339 or telephone bypass line 347. If the telephone is connected to telephone bypass line 347, the telephone operates with basic POTS service as is well known. If, by comparison, the telephone is connected to telephone line 339, then an ISDN telephone connection is established to CO (and ultimately a remote telephone) as follows.

Telephone calls may be placed from the telephone 345 to CO 362, as follows. Though the telephone calls are directed to an end user distant from the CO, the signaling and voice transfer of call set-up and information-carrying signals through a telephone system (not shown) is known and does not form a part of the present invention. Only the portion of the phone call from the telephone to and from the CO is described. The telephone communication techniques from the CO to the remote telephone are described in detail in numerous texts including "*Engineering and Operations in the Bell System*", R. F. Rey editor, AT&T Bell Laboratories, 1983. To make a phone call from the telephone, first the handset (not illustrated) of telephone 345 is picked up in step 801. Picking up the telephone handset results in the ringing SLIC 344 detecting an off-hook condition. When the ringing SLIC detects an off-hook condition, either DSP processor 322 or the network that the phone is connected to returns a dial tone to the telephone.

The following description presumes that the user selected an ISDN connection. CODEC 342 converts the analog telephone signal into a digital telephone signal, and transmits the digital telephone signal to the DSP processor.

The user then dials a phone number on telephone 345 in step 804. The telephone converts the numbers dialed into a dual tone multiple frequency (DTMF) signal. The DTMF signal is transmitted over telephone connector 343 and ringing SLIC 344 to CODEC 342. The CODEC converts the analog DTMF telephone signal to a digital DTMF signal, and transmits the digital DTMF signal via DSP serial bus 332, to DSP processor 322. The DSP processor detects the digits of the DTMF signal and forms the dialed phone number. The ISDN D-channel call set-up signal is then transmitted from the DSP processor 322 over the D-channel of either the ISDN S/T interface portion 340 or the ISDN U interface portion 338 (depending upon whether the adapter card is using S/T interface portion 340 or the U interface portion 338). The ISDN D-channel call set-up signal is transmitted to CO 362 (and ultimately to the telephone at the remote location).

When remote telephone receives the call set-up signal in step 902, the logical process depicted in FIG. 9 is followed. In decision step 906 DSP processor determines whether the telephone is in use or off-hook. If the answer to decision step 906 is NO, ringing SLIC 344 of remote telephone causes the remote telephone to ring in step 908. If the answer to decision step 906 is YES, then busy signal is generated back to original telephone in step 910. Following step 908 (which occurs when the phone is ringing) is decision step 912 that determines if phone is answered. If the remote phone is not answered, it will keep ringing until original telephone is hung up in step 916. If the phone is answered, a voice connection to be established between the remote phone and telephone 345 over ISDN subscriber loop 355 or 359 in step 914.

As soon as the voice connection is established, full-duplex voice communications may be transmitted between original telephone 345 and remote telephone via CO 362 (one CO is associated with each telephone and remote telephone) in step 812, as follows. End user speaks into telephone 345 that converts speech into an analog voice signal that is transmitted through telephone connector 343 and ringing SLIC 344 to CODEC 342. CODEC converts the analog voice signal into a digital voice signal. CODEC transmits the digital voice signal to DSP processor, that temporarily stores the digital voice signal in DSP registers (not shown). DSP processor then transmits the digital voice signal from the DSP registers to S/T interface portion 340 or U interface portion 338, and transmits the digital voice signal over the B channels of whichever ISDN interface portion 338 or 340 is used in adapter card 318. The appropriate ISDN interface processor 350 or 356 filters the digital voice signal. The appropriate ISDN interface transformer 352 or 357 transforms the digital voice signal to an ISDN B-channel telephone signal that can be transmitted over ISDN subscribe loop to CO 362 (and ultimately to the end user at the remote telephone). In this manner, telephone calls can be made from an analog telephone (using the adapter card 318) over digital ISDN network. In general, ISDN telephone call set-up signals are transmitted over ISDN D channels; while ISDN telephone voice signals are transmitted over ISDN B channels. Calls returning from remote telephone via CO 362 to original telephone 345 are handled in a similar, but reversed, manner.

Analog Modem Communications

There are two modems that can be used in the adapter card 318 of one embodiment of the present invention. The first modem involves ISDN modem communications that are transmitted over whichever ISDN portion (U interface 338 or S/T interface 240) is being used in adapter card 318. The first modem transmits and receives ISDN modem communications as depicted in FIGS. 6 and 7 as described above. An advantage of the first modem is that the entire communication between the sender and the receiver involves digital communications, and as such, image conversions from analog form to digital form (and vice versa) are limited.

The second modem in the adapter card involves analog modem transmissions, involving the analog modem portion 336. While it may be generally preferred to use the ISDN modem communications, there may be instances where the analog modem communications are desired. For example, if the ISDN system may be down or if a remote modem can only be accessed using POTS 349, only analog modem communications can be used. The end-user of computer 101 may select between ISDN modem communications and analog modem communications as an option at computer start-up.

Figure 10:
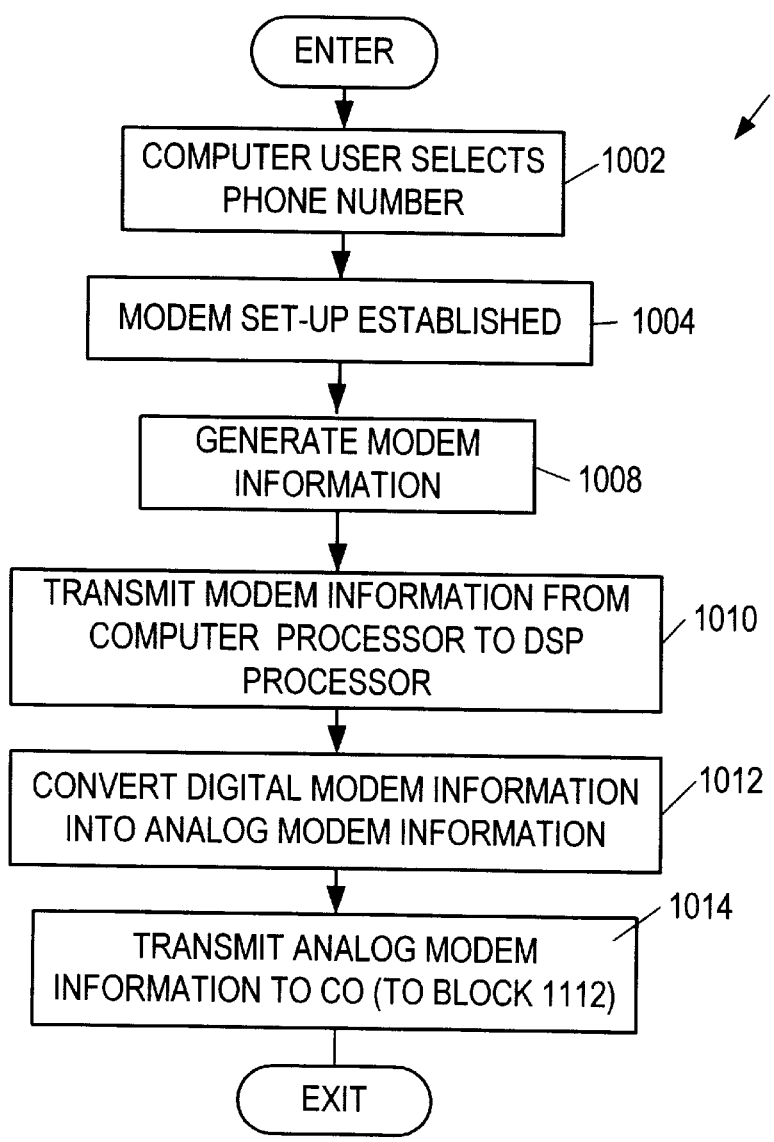
FIG. 10 depicts a block diagram of one embodiment of logic used by modem portion of adapter card in transmitting a modem transmission.
Figure 11:
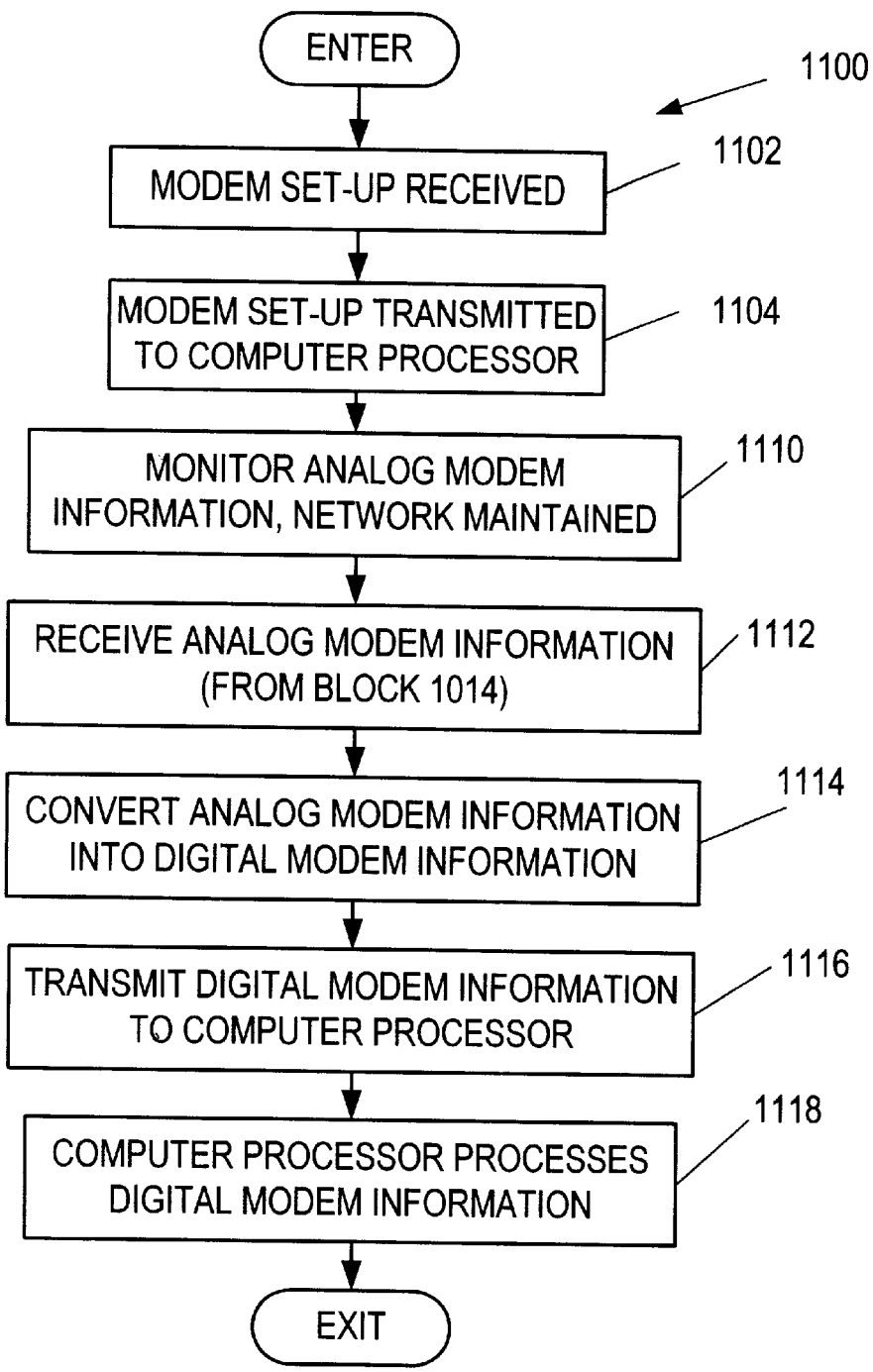
FIG. 11 depicts a block diagram of one embodiment of logic used by modem portion of adapter card in receiving a modem transmission.
Figure 12:
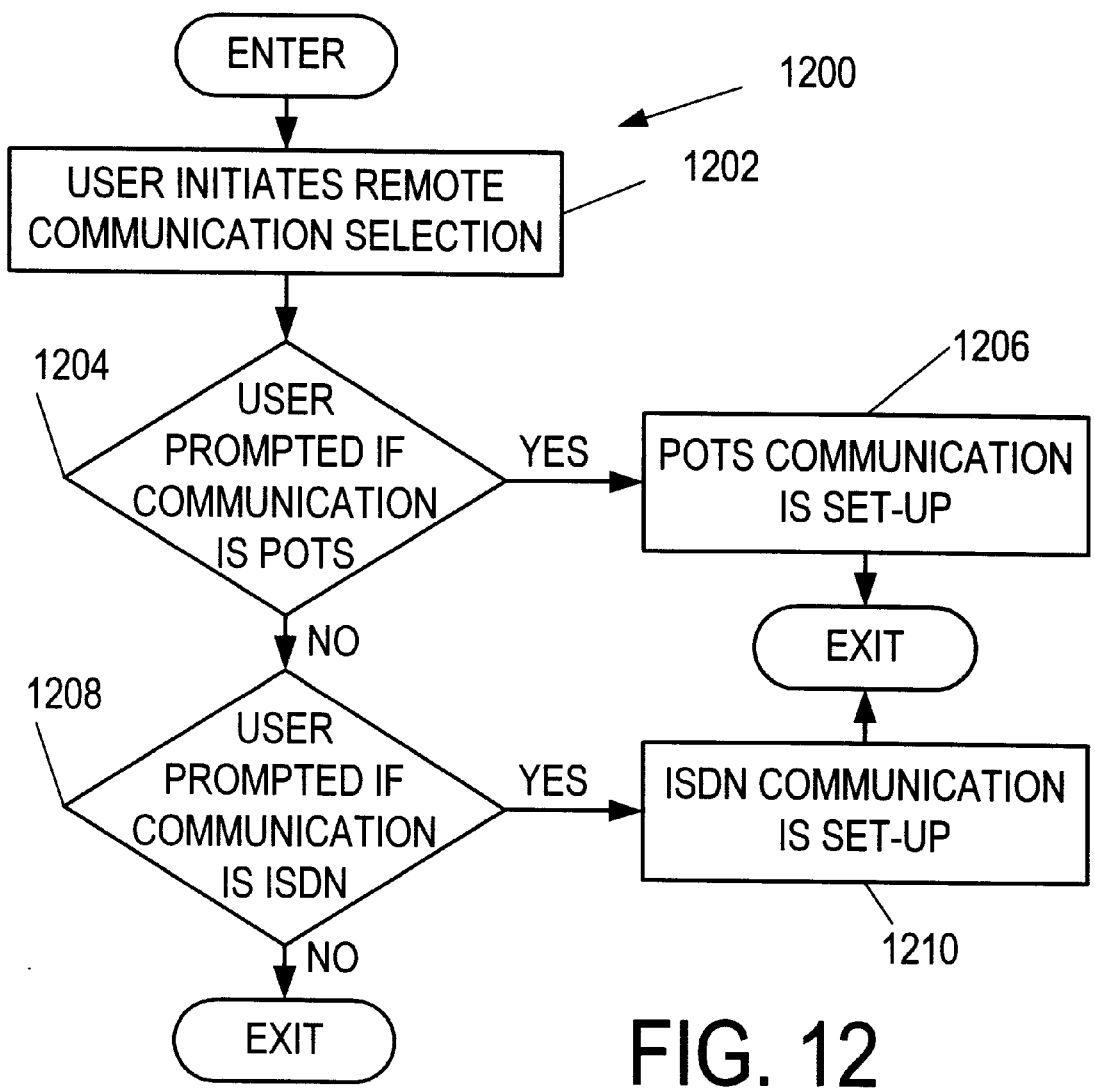
FIG. 12 depicts a block diagram used to provide an end user an option between transmitting via ISDN connection or transmitting via POTS connection.

This section describes analog modem communication. ISDN modem communications have been described above in the ISDN communications section relative to FIGS. 6 and 7. FIGS. 10 and 11 depicts analog modem communications between original devices and remote devices utilizing the modem portion 336. FIG. 10 depicts functions of transmitting modem involved with original device set-up signals and modem information signals. FIG. 11 depicts functions of receiving modem involved with remote device set-up signals and modem information signals.

Modem portion 336 of adapter card 318 provides modem communications that can be used by the computer 101. Modem set-up signal is used to establish communications with analog interface circuit 348 similarly to the call set-up signal transmitted between telephone portion 345 and a remote telephone. Analog modem requires information carrying signals to be transmitted only from transmitting device to receiving device 349, and does not require full duplex information-carrying signals between remote telephone and telephone 345 as does telephone communications. Modem/CODEC 348 of the modem portion 336 receives digital modem signals from CO 362 over either ISDN loop 355, 359. Analog modem modulates digital modem signal received by ISDN interface portions 338 or 340 into an analog modem signal. Analog modem transmits the analog modem signal to output device 349. Output device 349 is a device that can utilize the analog signal generated by the analog modem, i.e. a printer, a display, or a storage device.

Operation of modem portion 336 is controlled by computer processor 260 and DSP processor 322. An end user at computer 101 of transmitting device is queried by software as to the POTS phone number to which the end user wishes to establish a modem connection in step 1004. The user inputs phone number (usually by keyboard 270 in response to query displayed on display 232) in step 1002, and the phone number is input to computer processor. The phone number is transmitted in digital form over PCI bus 316 to ASIC 320. ASIC converts the telephone number and the associated software instructions to DSP processor 322. DSP processor then processes and transmits the digital phone number and instructions as digital modem set-up signal to modem interface circuit (where physical level processes are performed on the digital modem signal). Analog modem converts digital modem set-up signal to analog modem set-up signal, and transmits the analog modem set-up signal over POTS connector 349 to CO 362. ACK signals are used, in a known manner, to establish a modem connection between modem portion 336 and the corresponding modem portion of remote computer device 250. The modem information that is to be transmitted is then generated (if it has not already been done) in step 1008. The communication system 200 then establishes a digital modem information signal connection from computer 101 via ASIC 320 to DSP processor 322, and glue interface 328 to modem/CODEC 346 and analog interface circuit 348. The modem/CODEC converts the digital modem information signal passing from ISDN adapter card 318 to POTS connector 349 into an analog modem information signal in step 1012. The analog modem information signal is then transmitted to CO 362, and continues, if necessary, to remote modem device (not shown) in step 1014.

In FIG. 11, analog modem at receiving device receives set-up signals from CO 362 (and ultimately the original computer) in step 1102. The analog set-up signal is then transmitted to via POTS connector 349 to analog modem in step 1102, where the analog set-up signal is converted into digital form. The analog set-up signal is then transmitted to modem interface circuit to glue interface 328 and DSP processor 322. The DSP processor transmits the digital set-up signal to ASIC 320, and an ASIC interrupt has to be transmitted to computer processor 260 to transmit the digital set-up signal to computer processor.

If the computer processor 260 can establish a connection, then it transmits an ACK signal in step 1106 back to the original computer. If no connection can be established, then the computer transmits a NACK signal in step 1106 back to the original computer, both in a known manner.

After the ACK is transmitted from the transmitting modem back to the receiving modem, the receiving modem monitors the network for analog modem information in step 1112, during which time the network connection is maintained. In step 1114, the receiving analog modem converts the analog modem information into digital modem information at modem/CODEC 346, and transports the digital modem information via glue interface 328 to DSP processor 322. The processed information is then transmitted to ASIC and computer processor 260. The user can then access the digital modem information in any manner desired such as printing it, displaying it, storing it, using it in a sound card, or any other known technique in which modem information can be used.

The transmission using the ISDN portions 338 or 340 (depicted in FIGS. 6 and 7) is described separately form the transmission using the modem portion 336 (depicted in FIGS. 10 and 11). In another embodiment of the present invention, depicted in FIG. 12, an end-user may select between data being transmitted via the ISDN portions or via modem portion. In the FIG. 12 embodiment, the user initiates a remote communication selection in step 1202. The end-user indicates by selecting this step that they wish to communicate either via ISDN connection or via modem connection. The computer responds with a prompt indicating whether the end-user wishes to communicate via POTS in step 1204. If the response to step 1204 is yes, then the flow chart depicted in FIGS. 10 and 11 is followed as illustrated in step 1206. If the answer to decision step 1204 is no, then the FIG. 12 process continues to decision step 1208. In communication step 1208, the user is prompted as to whether the communication is ISDN. If the response to decision step 1208 is yes, then an ISDN communication is set up according to FIGS. 6 and 7 in step 1210. In this manner, the end-user selects whether data is to be transmitted via ISDN connection or modem connection.

Though several rather detailed embodiments, which incorporates the teachings of the present invention, have been shown and described in detail herein, those skilled in the art can readily devise many other embodiments that still utilize these teachings.

What is claimed is:

1. An apparatus comprising:
an adapter comprising:
 an Integrated Services Digital Network connection capable of connecting from a first device to a remote device on an Integrated Services Digital Network channel, comprising a U interface processor to provide U-interface functions to the Integrated Services Digital Network channel, and an S/T interface processor to provide S/T interface functions to the Integrated Services Digital Network channel,
 an analog modem connection comprising an analog modem and capable of connecting from the first device to the remote device, and
 a selector device that selects between the Integrated Services Digital Network connection and the analog modem connection, the selector device comprising:
  a digital signal processor;
  a memory to store instructions to be executed by the digital signal processor;
  an application specific integrated circuit coupled to the digital signal processor, the application specific integrated circuit to provide an external interface for the adapter to enable the digital signal processor to interact with a computer processor in the first device; and
  a glue interface to translate information between the digital signal processor and the U interface processor, the S/T interface processor and the analog modem,
  wherein the digital signal processor is responsive to commands from the computer processor in the first device to select the analog modem, the U interface processor or S/T interface processor for data transmission, the commands being received via the application specific integrated circuit.

2. The apparatus set forth in claim 1, wherein the first device is a computer.

3. The apparatus set forth in claim 2, wherein the computer processor is configured to process Integrated Services Digital Network information received from remote locations.

4. The apparatus set forth in claim 1, wherein
the computer processor generates first information, and
wherein the digital signal processor generates digital signal processor information in response to the first information.

5. The apparatus set forth in claim 4, wherein the computer processor controls operation of the digital signal processor.

6. The apparatus set forth in claim 4, wherein the digital signal processor controls operation of the U interface processor and the S/T interface processor.

7. The apparatus set forth in claim 1, wherein the S/T interface processor enables connecting multiple remote devices to a subscriber loop.

8. The apparatus set forth in claim 1, wherein the U interface processor enables connecting to a two-wire subscriber loop attached to only one remote device.

9. The apparatus set forth in claim 1, wherein the adapter is coupled to a telephone.

10. The apparatus set forth in claim 1,
wherein the digital signal processor generates digital signal processor information,
wherein the U interface processor generates first Integrated Services Digital Network signals in response to the digital signal processor information generated by the digital signal processor.

11. The apparatus set forth in claim 1, further comprising establishing a modem communication between the first device and the remote device.

12. The apparatus set forth in claim 11, wherein the modem connection includes an Integrated Services Digital Network modem.

13. An apparatus comprising:
a computer;
an adapter coupled to the computer, the adapter comprising:
an Integrated Services Digital Network connection capable of communicating ISDN signals between the computer and a remote device on an Integrated Services Digital Network channel, the Integrated Services Digital Network connection comprising a U interface processor to provide U-interface functions to the Integrated Services Digital Network channel, and an S/T interface processor to provide S/T interface functions to the Integrated Services Digital Network channel;
an analog modem connection comprising an analog modem and capable of communicating analog modem signals between the computer and the remote device; and
a selector device configured to select either the Integrated Services Digital Network connection or the modem connection to transfer information between the computer and the remote device, the selector device comprising:
a digital signal processor;
a memory to store data and instructions to be executed by the digital signal processor;
an application specific integrated circuit coupled to the digital signal processor, the application specific integrated circuit to provide a computer interface for the adapter to enable the digital signal processor to interact with a computer processor in the computer; and
a glue interface to translate information between the digital signal processor and the U interface processor, the S/T interface processor and the analog modem,
wherein the digital signal processor is responsive to commands from the computer processor in the computer, to select the analog modem, the U interface processor or S/T interface processor for data transmission, the commands being received via the application specific integrated circuit.

14. The apparatus set forth in claim 13, wherein the digital signal processor operates in response to the computer processor.

15. The apparatus set forth in claim 13, wherein the computer processor is configured to process Integrated Services Digital Network information received from the remote device.

16. The apparatus set forth in claim 13, wherein the analog modem connection is configured to communicate modem communications between the computer and the remote device.

17. The apparatus set forth in claim 16, wherein the analog modem is an Integrated Services Digital Network modem.

* * * * *